United States Patent [19]
Greene et al.

[11] 3,939,786
[45] Feb. 24, 1976

[54] SELF-PLANTER

[76] Inventors: George L. Greene, Rte. 1, Box 362; Sylvester A. Williams; Freddie L. Franklin, both of Rte. 1, Box 356, all of Crawfordville, Fla. 32327

[22] Filed: Aug. 20, 1974

[21] Appl. No.: 499,020

[52] U.S. Cl. .................................................. 111/3
[51] Int. Cl.² ........................................ A01C 11/00
[58] Field of Search ................................. 111/3, 2

[56] References Cited
UNITED STATES PATENTS

| | | | |
|---|---|---|---|
| 510,925 | 12/1893 | Moore et al. | 111/3 |
| 1,517,715 | 12/1924 | De Geus | 111/3 X |
| 1,613,542 | 1/1927 | Steward | 111/3 X |
| 2,889,959 | 6/1959 | Landgraf | 111/3 X |
| 3,002,473 | 10/1961 | Morine | 111/2 |

*Primary Examiner*—Stephen C. Pellegrino
*Attorney, Agent, or Firm*—Clarence A. O'Brien; Harvey B. Jacobson

[57] ABSTRACT

A self-planter having a frame capable of being moved along the ground. A projector is mounted on the frame for forcing plants into ground being traversed by the frame. Plants are fed into a barrel of the projector by a carrying chain that passes through a slot in the bottom of a hopper mounted on the frame for holding a supply of plants to be planted. A catch is provided on the carrying chain for engaging a plant in the hopper and transferring the plant to the projector. The projector advantageously employs a reciprocating piston actuated by rotation of wheels movably supporting the frame.

10 Claims, 7 Drawing Figures

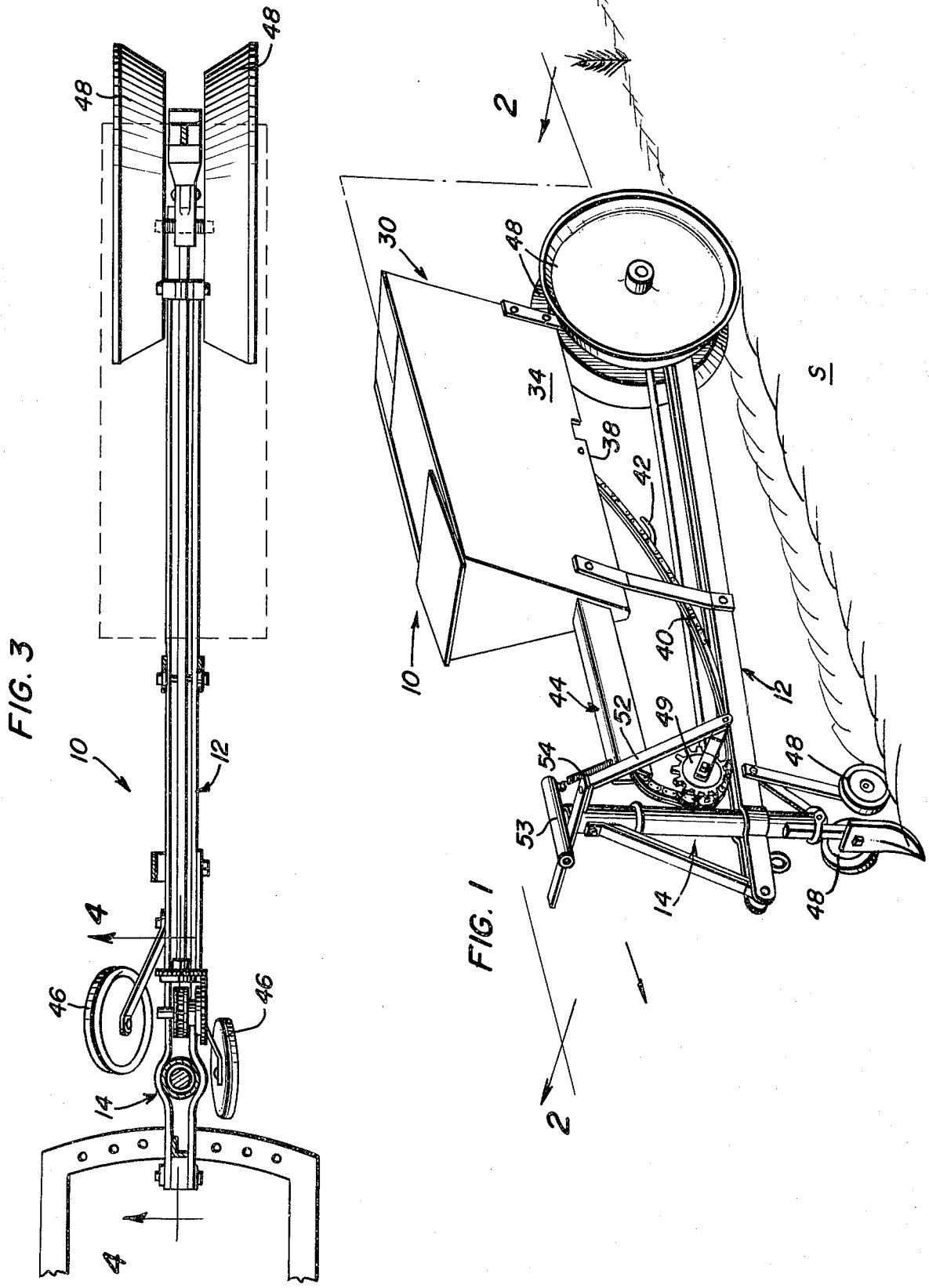

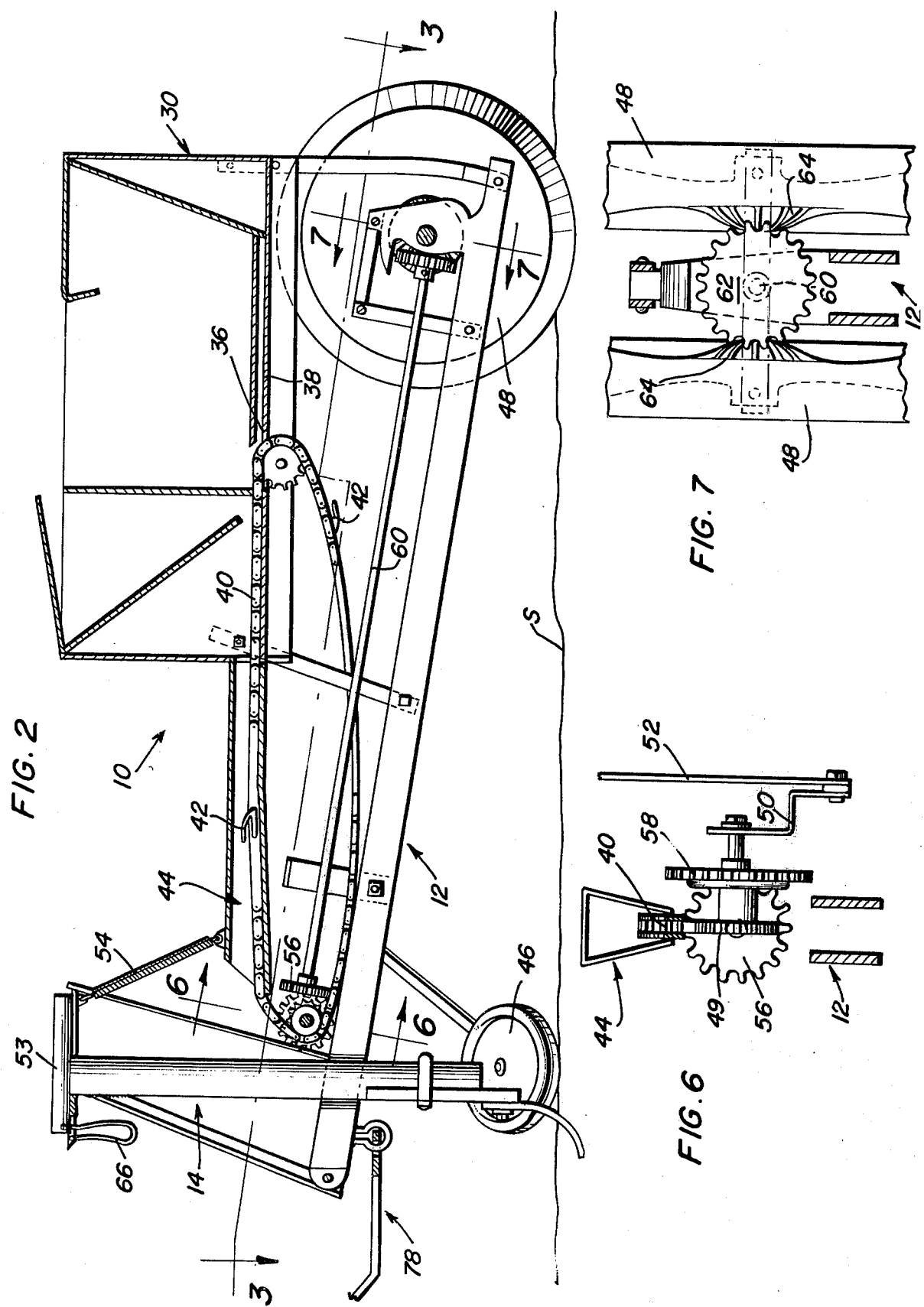

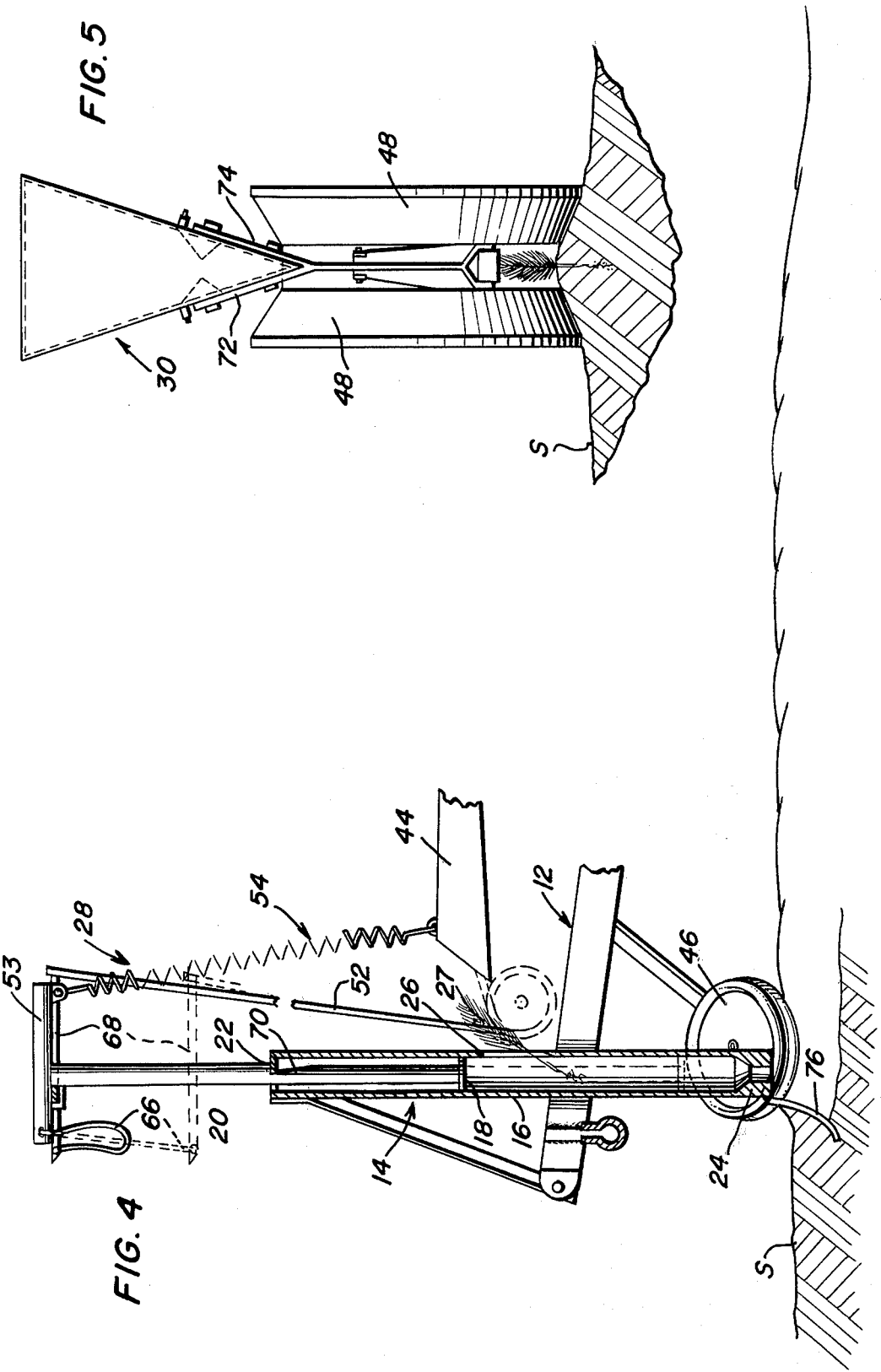

SELF-PLANTER

BACKGROUND OF THE INVENTION

1. Field of the Invention

This invention relates generally to a machine for planting young plants, and particularly to a self-planter specifically designed for plating young trees such as pines, cedars, and the like.

2. Description of the Prior Art

In most areas where young pines, and the like, are planted, the country is wild, thick and rough. Some areas are cultivated lightly with very heavy tractors, and other areas are not. Because of the ruggedness of the ground, a special kind of machine is essential to achieve mechanized planting. Due to the lack of such machines, pine planters are confronted with dangerous, strenuous, and unpleasant work, and expose themselves to the possibility of being killed or injured because of setting on the back of a hand planter when same is struck by a root, or because of being bitten by a poisonous snake, or because of being knocked off a vehicle when same is passing over rough ground.

U.S. Pat. Nos. 510,925, issued Dec. 19, 1893 to C. O. Moore, 2,473,261, issued June 14, 1949, to G. P. Ruhl, and 2,890,665, issued June 16, 1959, to L. S. C. Kang, disclose examples of prior art plant setting machines.

SUMMARY OF THE INVENTION

It is an object of the present invention to provide a planting machine that eliminates the dangerous, strenuous, and unpleasant work that pine planters are confronted with.

It is another object of the present invention to provide a planting machine that will reduce high labor costs and eliminate injuries to pine planters.

It is yet another object of the present invention to provide a self-planting machine capable of planting small plants such as pine trees, and the like, in rough terrain by being towed behind a tractor, and the like.

These and other objects are achieved according to the present invention by providing a planting device having: a frame capable of being moved along the ground; and a projector mounted on the frame for sequentially forcing plants into the ground being traversed.

A preferred projector according to the present invention advantageously includes a cylinder having a pair of open ends, a piston slidably disposed in the cylinder, a rod connected to the piston and arranged extending out one of the ends of the cylinder, with the other of the ends of the cylinder being restricted to form a nozzle, and an opening provided in the cylinder for permitting a plant to pass into the cylinder between an extreme position of the piston and the other of the ends.

A hopper is advantageously mounted on the frame and arranged for holding a supply of plants to be planted. A feeding arrangement is mounted on the frame as well for transferring plants from the hopper to the projector. This feeding arrangement advantageously includes an endless carrying chain arranged extending between the hopper and the cylinder. A catch mounted on the chain for movement therewith engages a plant as the catch cyclically passes through a slot in the bottom of the hopper and removes the plant from the hopper to the cylinder. A plant chute may be arranged along the transferring portion or run of the chain for guiding a plant from the hopper slot to the cylinder opening.

Wheels are advantageously provided on the frame for movably supporting same over the ground, and the piston rod which forms part of the projector is actuated together with the carrying chain by an arrangement which operably connects these elements to at least some of the wheels for being imparted motion by the wheels as the frame moves along the ground.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a self-planter according to the present invention.

FIG. 2 is a fragmentary, sectional view taken generally along the line 2—2 of FIG. 1.

FIG. 3 is a fragmentary, sectional view taken generally along the line 3—3 of FIG. 2.

FIG. 4 is a fragmentary, sectional view taken generally along the line 4—4 of FIG. 3.

FIG. 5 is a fragmentary, rear elevational view, with the ground shown in section, showing the self-planter of FIGS. 1 through 4.

FIG. 6 is a fragmentary, sectional view taken generally along the line 6—6 of FIG. 2.

FIG. 7 is a fragmentary, sectional view taken generally along the line 7—7 of FIG. 2.

DESCRIPTION OF THE PREFERRED EMBODIMENTS

Referring now more particularly to FIGS. 1 through 3 of the drawings, a self-planter 10 according to the present invention has a longitudinally extending rail-like frame 12 capable of being moved along ground or other supporting surface S. A projector 14 is mounted on frame 12 sequentially forcing plants (not shown) into the ground.

As perhaps can best be seen from FIG. 4 of the drawings, projector 14 includes a cylinder 16 having a pair of open ends. A piston 18 is slidably disposed in cylinder 16, with a piston rod 20 being connected to piston 18 and arranged extending out end 22 of cylinder 16. The other of the ends of cylinder 16, that designated 24, is advantageously restricted to form a nozzle. An opening 26 is advantageously provided in the cylindrical wall forming cylinder 16 for permitting a plant 27 to pass into cylinder 16 at a time when piston 18 is in its uppermost position so that the plant will be disposed between the extreme upper position of the piston and end 24. An actuator arrangement 28, to be described in detail below, is connected to rod 20 for sliding same, and piston 18, along the longitudinal extent of cylinder 16.

Referring now to FIG. 5 of the drawings in addition to FIGS. 1 to 3, a substantially V-shaped hopper 30 is mounted on frame 12 and is arranged for holding a supply of plants to be fed to projector 14. A feed arrangement 32, which like arrangement 28 will be described in detail below, is mounted on frame 12 for individually and sequentially transferring the plants from hopper 30 to projector 14.

As mentioned above, hopper 30 is substantially V-shaped, and is provided with a bottom portion 34 having a bottomly disposed slot 36 extending along a portion of the apex 38 of the V formed by the hopper. Feed arrangement 32 includes an endless carrying chain 40 arranged extending between hopper 30 and cylinder 16. At least one, and advantageously a plurality of catches 42 are mounted on chain 40 for movement therewith. Chain 40 is arranged passing into hopper 30 through slot 36 so as to cyclically pass catches 42 into bottom portion 34 of the hopper and engage a plant therein for removing the plant to cylinder 16. A generally U-shaped plant chute 44 may be arranged along a portion of the plant carrying run of chain 40 for assisting in guiding a plant from hopper slot 36 to cylinder opening 26.

Wheels 46 and 48 are advantageously provided on frame 12 for movably supporting the frame on surface S. Actuator arrangement 28 and the drive sprocket 49 of carrying chain 40 are both operably connected to the rear wheels 48 for being imparted motion thereby as frame 12 moves along the ground. Referring to FIG. 6 of the drawings together with FIGS. 1 through 3, arrangement 28 includes a crank 50 mounted on the rotatable shaft of sprocket 49 for rotation with the sprocket. A link 52 is pivotally connected to crank 50 and to piston rod 20 for receiving reciprocating motion from crank 50 and imparting same to the piston rod. As perhaps can best be seen from FIG. 2 of the drawings, an arm 53 is mounted on the upper end of rod 20 to form a keyshaped member. A conventional coiled spring, and the like, designated 54, is arranged connected to and extending between rod 20 and frame 12, specifically chute 44, for providing piston 18 with a quick stroke toward end 24 in order to facilitate discharge of a plant.

By referring to FIGS. 2, 6, and 7 of the drawings, it can be seen that motion is transferred to crank 50 by a pair of perpendicularly arranged gears 56 and 58. Gear 56 is rotated by a drive shaft 60 itself connected to, and rotated by, a gear 62. Gear 62 in turn meshes with gears 64 provided on the inner hub portions of the rear wheels 48. Thus, as can be readily appreciated from the drawings, rotation of wheels 48 as planter 10 moves over surface S will rotate gears 64, gear 62, shaft 60, gears 56 and 58, crank 50, link 52, and rod 20.

A tension cord 66 is attached to the crossbar formed by arm 53 and to link 52 by a guide member 68. When piston 18 is lifted by action of guide 68 on arm 53, which action effects the connection of link 52 to arm 53, to its extreme uppermost position, shown by full lines in FIG. 4, then tension cord 66 is placed in the position seen in FIG. 4. Simultaneously, a trigger 70, formed by a wedge-shaped recess provided in rod 20, takes the position shown in FIG. 4 wherein the wedge engages with the lip surrounding the hole in end 22 of the cylinder 16. As link 52 retracts due to continued rotation of crank 50, piston 18 is left in its illustrated full line lifted position due to the action of trigger 70. Since tension cord 66 is attached to guide 68 and arm 53, trigger 70 will be released when guide 68 reaches a predetermined distance from, or with respect to, end 22 of cylinder 16. To amplify operation of the trigger mechanism, it will be appreciated that when, for example, guide 68 reaches its broken line position in FIG. 4, tension cord 66 will be in its broken line position and, thus, taut. Continued downward movement of guide 68 will force trigger 70 to release from end 22 and permit downward movement of piston 18 under the influence of spring 54. In this manner, a plant 27 positioned in cylinder 16 beneath piston 18 will be driven through end 24 and into the ground forming surface S.

As can best be seen from FIG. 5 of the drawings, bottom portion 34 of hopper 30 is advantageously formed by two pieces of metal 72 and 74 clamped onto hopper 30 in a conventional manner so as to permit up and down adjustment of these pieces of metal. This adjustment of pieces 72 permits slot 30 to be adjusted between a predetermined fully opened position and a closed position. Thus, slot 36 can be adjusted for optimumly accommodating any size plant, and assures that a particular plant placed in hopper 30 will fall one at a time into slot 36.

For rugged and/or rooty ground, a cutting plow 76 is advantageously arranged at the bottom of cylinder 16 between wheels 46. Plow 76 is capable of cutting through roots and opening a furrow at the same time. After a plant is kicked out of cylinder 16 by the action of piston 18 moving downwardly in the cylinder, the plant falls into a plowed row, that may be formed by plow 76, which row is then packed by the two angled wheels 46. These wheels 46 cause the plant to sit upright, with the dirt being pulled tightly to the roots of the plant by the action of the wheels.

Planter 10 is designed to be pulled behind a tractor (not shown) and the like, which advantageously operates on the hydraulic system, which is the same mode of operation as that of a conventional sealed plow. When planter 10 is connected to the tractor as by hitch 78, the large rear wheels 48 turn causing the machine to perform its operation. First, the plants are loaded into hopper 30, with the hopper being the transit container for the plants. Then, one plant at a time drops into slot 36, with the slot acting as a plant divider for hopper 30. Then the divided or separated plant is received by a catch 42 traveling through slot 36. This catch 42 is advantageously a fork like device attached to chain 40 which is being rotated by the turning of wheels 48. Chain 40 and its associated catch or catches 42 act as the distributor for the machine.

Third, chain 40 and catch 42 deliver the plant into cylinder 16. The cylinder now becomes a temporary storage area for the plant. The restriction in end 24 forms a funnel-shaped device which may hold the plant deposited in cylinder 16. Next, the plant is kicked out of cylinder 16 by the force from the downward movement of piston 18. The piston permitted to move downwardly in the manner described above, and the various elements are so arranged as to time the release of piston 18 so as to permit the projector 14 to act as a spotter for the machine.

Slot 36 is a very advantageous feature of the present invention, in that it can be considered as the filter of the machine. In general, the object of the V-shaped hopper is to maintain a constant flow of plants and to make sure that the plants are directed into slot 36. The plants drop one plant at a time into slot 36, which slot makes it possible for only one plant to be picked up by a catch 42 at a time. Once a plant is deposited in cylinder 16, the funnel-shaped device formed in end 24 functions as an orientating control arrangement for the plant. Further, this device directs the plant into the furrow.

As can be readily appreciated from the above description and the accompanying drawings, a self-planter according to the present invention greatly facilitates and simplifies the planting of young trees, such as pines, cedars, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A self-planter, comprising, in combination:
   a. a frame capable of being moved along a supporting surface;
   b. planting elements mounted on the frame, the elements including a furrow opener, setter, and packing wheels; and
   c. projector means mounted on the frame for sequentially forcing plants into the ground, the projector means including a cylinder having a pair of open ends, a piston slidably disposed in the cylinder, a rod connected to the piston and arranged extending out one of the ends of the cylinder, the other of the ends of the cylinder being restricted to form a plant holding device, an opening provided in the cylinder for permitting a plant to pass into the cylinder between an extreme position of the piston and the other of the ends, and actuator means mounted on the frame and connected to the rod for sliding the piston in the cylinder.

2. A structure as defined in claim 1, wherein the plant holding device is funnel-shaped and further including a hopper mounted on the frame and arranged for holding a supply of plants, and feed means mounted on the frame for individually and sequentially transferring plants from the hopper to the projector means.

3. A structure as defined in claim 2, wherein the hopper is substantially V-shaped, and is provided with a bottomly disposed slot extending along a portion of the apex of the V for separating plants in the hopper and passing the plants one at a time to the feed means.

4. A structure as defined in claim 3, wherein the feed means includes an endless carrying chain arranged extending between the hopper and the cylinder, a catch mounted on the chain for movement therewith, the chain arranged for passing the catch cyclically into the slot and permitting the catch to engage a single plant therein for removing the plant to the cylinder, and a plant chute arranged along a portion of the chain for guiding a plant from the hopper slot to the cylinder opening.

5. A structure as defined in claim 4, wherein wheels are provided on the frame, and the piston rod actuating means and the carrying chain are both operably connected to the wheels for being imparted motion thereby as the frame moves along the ground.

6. A structure as defined in claim 5, wherein the actuating means includes a rotatably mounted crank, a link pivotally connected to the crank for reciprocating movement thereby and selectively connectible to the piston rod for moving same toward the one of the ends, and a spring arranged connected between the piston rod and the frame for providing the piston with a quick stroke toward the other of the ends.

7. A structure as defined in claim 6, wherein the actuating means further includes a trigger mechanism associated with the piston rod and the cylinder for retaining the piston rod in a predetermined position with respect to the cylinder, and a cord attached to the piston rod and to the link for releasing the trigger mechanism when the link is in a predetermined position relative to the piston rod.

8. A structure as defined in claim 4, wherein wheels are provided on the frame, and the piston rod actuating means and the carrying chain are both operably connected to the wheels for being imparted motion thereby as the frame moves along the ground.

9. A structure as defined in claim 8, wherein the actuating means includes a rotatably mounted crank, a link pivotally connected to the crank for reciprocating movement thereby and selectively connectible to the piston rod for moving same toward the one of the ends, and a spring arranged connected between the piston rod and the frame for providing the piston with a quick stroke toward the other of the ends.

10. A structure as defined in claim 9, wherein the actuating means further includes a trigger mechanism associated with the piston rod and the cylinder for retaining the piston rod in a predetermined position with respect to the cylinder, and a cord attached to the piston rod and to the link for releasing the trigger mechanism when the link is in a predetermined position relative to the piston rod.

* * * * *